United States Patent
Maeda et al.

(10) Patent No.: US 12,066,665 B2
(45) Date of Patent: Aug. 20, 2024

(54) OPTICAL CIRCUIT FOR ALIGNMENT AND OPTICAL ALIGNMENT METHOD

(71) Applicant: Nippon Telegraph and Telephone Corporation, Tokyo (JP)

(72) Inventors: Yoshiho Maeda, Tokyo (JP); Toru Miura, Tokyo (JP); Hiroshi Fukuda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 291 days.

(21) Appl. No.: 17/598,767

(22) PCT Filed: Apr. 9, 2020

(86) PCT No.: PCT/JP2020/015941
§ 371 (c)(1),
(2) Date: Sep. 27, 2021

(87) PCT Pub. No.: WO2020/218005
PCT Pub. Date: Oct. 29, 2020

(65) Prior Publication Data
US 2022/0171134 A1    Jun. 2, 2022

(30) Foreign Application Priority Data

Apr. 25, 2019 (JP) ................................ 2019-083814

(51) Int. Cl.
*G02B 6/35* (2006.01)
*G02B 6/293* (2006.01)
(Continued)

(52) U.S. Cl.
CPC ............. *G02B 6/34* (2013.01); *G02B 6/2935* (2013.01); *G02B 6/30* (2013.01); *G02B 6/3588* (2013.01)

(58) Field of Classification Search
CPC .................................................... G02B 6/3588
See application file for complete search history.

(56) References Cited

U.S. PATENT DOCUMENTS 7,224,174 B1 * 5/2007 Malendevich ....... G02B 6/2931
                                                     324/754.23
8,422,845 B2 * 4/2013 Kang .................. H01L 21/7624
                                                     385/125
(Continued)

FOREIGN PATENT DOCUMENTS

JP    2012133363 A    7/2012
JP    2014026108 A    2/2014
(Continued)

OTHER PUBLICATIONS

Taillaert et al. "An Out-of-Plane Grating Coupler for Efficient Butt-Coupling Between Compact Planar Waveguides and Single-Mode Fibers," IEEE Journal of Quantum Electronics, vol. 38, No. 7, Jul. 2002. pp. 949-955.

*Primary Examiner* — Charlie Y Peng
(74) *Attorney, Agent, or Firm* — Slater Matsil, LLP

(57) ABSTRACT

There is provided an optical waveguide constituted by a core made of a semiconductor and formed on a substrate. A grating coupler is provided at one end of the optical waveguide. Further, a reflecting portion formed on the optical waveguide by being optically coupled to the optical waveguide is provided at the other end of the optical waveguide. The optical waveguide constituted by the core includes a light intensity modulation unit that modulates an intensity of guided light in the optical waveguide. The light intensity modulation unit is constituted by a variable optical attenuator.

7 Claims, 9 Drawing Sheets

(51) Int. Cl.
 *G02B 6/30* (2006.01)
 *G02B 6/34* (2006.01)

(56) References Cited

U.S. PATENT DOCUMENTS

| | | | | |
|---|---|---|---|---|
| 8,818,203 B2* | 8/2014 | Ji | ............................ | G02B 6/30 |
| | | | | 398/189 |
| 9,519,115 B2* | 12/2016 | Yashiki | ................ | G02B 6/4207 |
| 10,088,299 B2* | 10/2018 | Tokushima | .............. | G02B 6/34 |
| 2009/0244685 A1* | 10/2009 | Hoshida | ........... | H04B 10/50575 |
| | | | | 359/279 |
| 2010/0104241 A1 | 4/2010 | Oikawa et al. | | |
| 2012/0155888 A1 | 6/2012 | Ji et al. | | |
| 2013/0209020 A1* | 8/2013 | Doerr | ................... | G02F 1/2257 |
| | | | | 385/2 |
| 2018/0010906 A1 | 1/2018 | Tokushima | | |

FOREIGN PATENT DOCUMENTS

| | | | |
|---|---|---|---|
| JP | 2015206977 A | | 11/2015 |
| JP | 2018005067 A | | 1/2018 |
| JP | 2018128506 A | | 8/2018 |
| JP | 2019045749 A | | 3/2019 |
| WO | 2008117713 A1 | | 10/2008 |

\* cited by examiner

OPTICAL CIRCUIT FOR ALIGNMENT AND OPTICAL ALIGNMENT METHOD

CROSS-REFERENCE TO RELATED APPLICATIONS

This application is a national phase entry of PCT Application No. PCT/JP2020/015941, filed on Apr. 9, 2020, which claims priority to Japanese Application No. 2019-083814, filed on Apr. 25, 2019, which applications are hereby incorporated herein by reference.

TECHNICAL FIELD

The present invention relates to an optical circuit for aligning which is used for optical connection between a grating coupler and an optical fiber, and an optical aligning method.

BACKGROUND

With increasing traffic of optical communications, there is a demand for reduction in cost as well as increasing speed and downsizing of optical transceivers. For downsizing and reduction in cost of the optical transceiver, an optical circuit including an optical filter, an optical modulator, and the like, which is a component of the optical transceiver, is also required to be manufactured at a low cost and have a smaller size.

In recent years, silicon photonics (SiPh) has attracted attention as a technology for achieving a small optical circuit at a low cost, and research and development of SiPh optical circuits have been actively advanced. Of manufacturing costs of the optical transceiver using the SiPh optical circuit, a proportion occupied by mounting and inspection steps is large, and it is important to devise these steps for advancing reduction in cost of the optical transceiver. To this end, it is desirable to inspect SiPh optical circuits on a wafer (substrate) before being cut into chips to select a good product, and then to cut the wafer into chips and module-mount a selected good chip.

For the inspection of an SiPh optical circuit, a method of causing light to enter the SiPh optical circuit from an external light source and evaluating an insertion loss (IL) and operating characteristics is common. Thus, a grating coupler capable of coupling light from the outside to an optical waveguide of SiPh is important for inspection on a wafer.

In the inspection using a grating coupler in the related art, after setting an angle, a wavelength, and polarization of incident light from an optical fiber to respective design values, the optical fiber is scanned to explore a point where an optical coupling efficiency between the optical fiber and the grating coupler is maximized, thereby performing aligning.

An optical circuit for aligning using a grating coupler will be described with reference to FIG. 7. For example, there is an optical circuit for aligning including: a grating coupler 302 formed at one end of an optical waveguide constituted by a core 301 made of a semiconductor; and a reflecting portion 303 formed at the other end of the optical waveguide constituted by the core 301. In this optical circuit for aligning, only light coupled with the grating coupler 302 propagates in the optical waveguide, and returned light from the optical circuit for aligning reflected by the reflecting portion 303 is obtained as a signal.

In the case of an optical waveguide made of silicon, signal light that is guided through the optical waveguide is guided to an optical fiber 304 to be aligned and emitted from an emission end as light for aligning. In this state, the optical fiber 304 is scanned. When light source light emitted from the optical fiber 304 is coupled to the grating coupler 302, the signal light in the light source light propagates in the optical waveguide constituted by the core 301. The returned light reflected by the reflecting portion 303 at the other end of the optical waveguide is received by the optical fiber 304 again. The optical fiber 304 is scanned over a wide range (rough aligning) so that the intensity of the signal light received in the optical fiber 304 is maximized, thereby aligning the optical fiber 304 and the grating coupler 302.

As described in Non Patent Literature 1, an optical coupling efficiency of a grating coupler is sensitive to not only planar coordinates but also an angle, polarization, and a wavelength of incident light. Thus, for highly efficient optical coupling, it is important to align polarization and a wavelength in addition to alignment of six axes, that is, an X-axis, a Y-axis, a Z-axis, and angles with respect to the respective axes between the optical fiber and the grating coupler. By sweeping a position of the optical fiber, the optical fiber is moved to a position where optical coupling with the grating coupler is achieved (rough aligning), and in a state where the grating coupler and the optical fiber are coupled, precise alignment (fine aligning) and alignment of an angle, a wavelength, and polarization are performed.

CITATION LIST

Non Patent Literature

Non Patent Literature 1: D. Taillaert et al., "An Out-of-Plane Grating Coupler for Efficient Butt-Coupling Between Compact Planar Waveguides and Single-Mode Fibers", IEEE Journal of Quantum Electronics, vol. 38, no. 7, pp. 949-955, 2002.

SUMMARY

Technical Problem

As described above, in order to cause light to enter an SiPh optical circuit, precise aligning and alignment of polarization and a wavelength are required between a grating coupler and an optical fiber that become a light incident/exiting unit of the optical circuit; however, in general, the grating coupler has an insertion loss of 3 dB or more in principle, and signal light is subjected to a loss of 6 dB or more when passing through the grating coupler twice, as the aforementioned aligning.

Furthermore, manufacturing variation of grating couplers is greater than that of other optical circuits, an optimal coupling position, an angle, and a wavelength easily have deviation from the design or have individual differences, and an insertion loss is increased due to deviation from the design wavelength and polarization, which tends to cause a decrease in signal level.

In a general SiPh wafer in which a SiPh optical circuit is formed, a planarization step by a chemical mechanical polishing (CMP) is often included in the manufacturing process of the SiPh optical circuit. In this planarization step by CMP, a geometric structure called a dummy pattern is bedded around a device of the SiPh optical circuit to ensure planarity in a wafer surface. The dummy pattern has irregularity, reflects and scatters light from an optical fiber at the time of rough aligning and fine aligning described above, and the reflected and scattered light becomes noise as returned light, which causes a reduction in signal to noise ratio (S/N) at the time of aligning.

Thus, there is a problem in that in aligning the grating coupler of the SiPh optical circuit and the optical fiber, due to a reduction in signal by the insertion loss and the manufacturing error of the grating coupler and noise by a peripheral structure such as a dummy pattern, a response signal from a device is buried in the noise to make aligning difficult, which sometimes causes aligning to a wrong position.

Embodiments of the present invention are contrived to solve the above-described problem, and an object thereof is to enable improvement of an S/N ratio in optical aligning using an optical circuit for aligning.

Means for Solving the Problem

An optical circuit for aligning according to embodiments of the present invention includes: an optical waveguide formed on a substrate, the optical waveguide being constituted by a core made of a semiconductor; a grating coupler formed in the core of one end of the optical waveguide, the grating coupler being constituted by grating; a reflecting portion formed at the other end of the optical waveguide, the reflecting portion being optically coupled to the optical waveguide; and a light intensity modulation unit provided in the optical waveguide, the light intensity modulation unit being configured to modulate an intensity of guided light in the optical waveguide.

In one configuration example of the optical circuit for aligning described above, the light intensity modulation unit is constituted by a variable optical attenuator.

In one configuration example of the optical circuit for aligning described above, the variable optical attenuator is constituted by a Mach-Zehnder interference structure formed in the optical waveguide between the grating coupler and the reflecting portion.

In one configuration example of the optical circuit for aligning described above, the variable optical attenuator includes a p-n junction formed in the core of the optical waveguide between the grating coupler and the reflecting portion.

In one configuration example of the optical circuit for aligning described above, the variable optical attenuator includes a p-n junction formed in the core of the grating coupler.

In one example configuration of the optical circuit for aligning described above, the semiconductor is silicon.

An optical aligning method according to embodiments of the present invention is an optical aligning method using the optical circuit for aligning, the method including: a first step of performing rough aligning for making a state in which light for aligning emitted from an optical fiber to be aligned is optically coupleable to a grating coupler; and a second step of performing fine aligning for making a state in which optical coupling of the light for aligning to the grating coupler is maximized after the rough aligning, wherein in the second step, the light for aligning optically coupled with the grating coupler and guided in an optical waveguide is subjected to intensity modulation by a light intensity modulation unit and emitted from the grating coupler, an intensity-modulated light subjected to intensity modulation by the light intensity modulation unit and emitted from the grating coupler is subjected to synchronous detection, and fine aligning is performed using the intensity-modulated light subjected to synchronous detection to make a state in which optical coupling of the light for aligning to the grating coupler is maximized.

Effects of Embodiments of the Invention

As described above, according to embodiments of the present invention, a light intensity modulation unit is provided in an optical waveguide constituted by a core made of a semiconductor, in which a grating coupler is provided, and thus an S/N ratio in optical aligning using an optical circuit for aligning can be improved.

DETAILED DESCRIPTION OF ILLUSTRATIVE EMBODIMENTS

Figure 1:
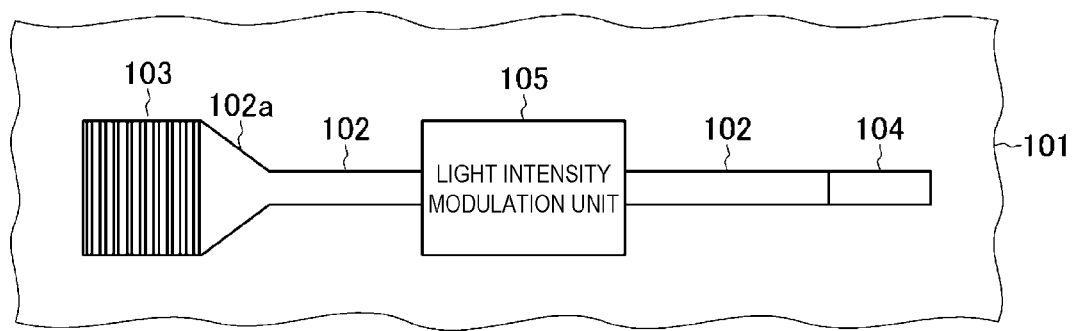
FIG. 1 is a configuration diagram illustrating a configuration of an optical circuit for aligning according to an embodiment of the present invention.

Hereinafter, an optical circuit for aligning according to an embodiment of the present invention will be described with reference to FIG. 1. The optical circuit for aligning includes an optical waveguide constituted by a core 102 made of a semiconductor and formed on a substrate 101. A grating coupler 103 is provided at one end of the optical waveguide. Further, at the other end of the optical waveguide, a reflecting portion 104 formed optically coupled to the optical waveguide is provided.

The grating coupler 103 is constituted by grating including a plurality of grooves formed in a top surface of the core 102 at one end of the optical waveguide. Toward one end of the optical waveguide, the core 102 includes a tapered portion iota in which the core width gradually expands. A tapered optical waveguide is formed by the tapered portion iota. The grating coupler 103 is adiabatically connected to the optical waveguide by the core 102 via a tapered optical waveguide constituted by the tapered portion iota. Note that the grating coupler 103 may have a configuration in which a shape in a planar view is a sector.

The semiconductor is, for example, silicon. The substrate 101 is, for example, a well-known silicon-on-insulator (SOI) substrate, an embedded insulating layer thereof is a lower clad, and its surface silicon layer is patterned to form the core 102, a grating in the grating coupler 103, and the like. An optical waveguide is formed with the lower clad, the core 102, and an air layer on the upper portion of the core 102 formed as described above as an upper clad. The upper clad may have a two-layer structure of $SiO_2$ and SiN.

For example, the core 102 has a width of 0.44 µm and a height of 0.22 µm in a cross-sectional view. The grating coupler 103 is constituted by grating formed in a region with a width of 20 µm and a length of 30 µm. Additionally, for example, the grating has a groove pitch of 0.635 µm, a duty ratio of 0.5, and a depth of 0.07 µm.

In the embodiment, a well-known optical circuit for aligning having the configuration described above includes, in the optical waveguide, a light intensity modulation unit 105 that modulates an intensity of guided light in the optical waveguide. The light intensity modulation unit 105 is constituted by a variable optical attenuator. The variable optical attenuator may be constituted by a Mach-Zehnder interference structure formed in the optical waveguide between the grating coupler 103 and the reflecting portion 104. The variable optical attenuator may have a p-n junction formed in the core 102 of the optical waveguide between the grating coupler 103 and the reflecting portion 104. Alternatively, the light intensity modulation unit (variable optical attenuator) may be provided in the grating coupler 103, and in this case, the variable optical attenuator may have a p-n junction formed in the core 102 of the grating coupler 103. Details of the variable optical attenuator will be described below.

Figure 2:
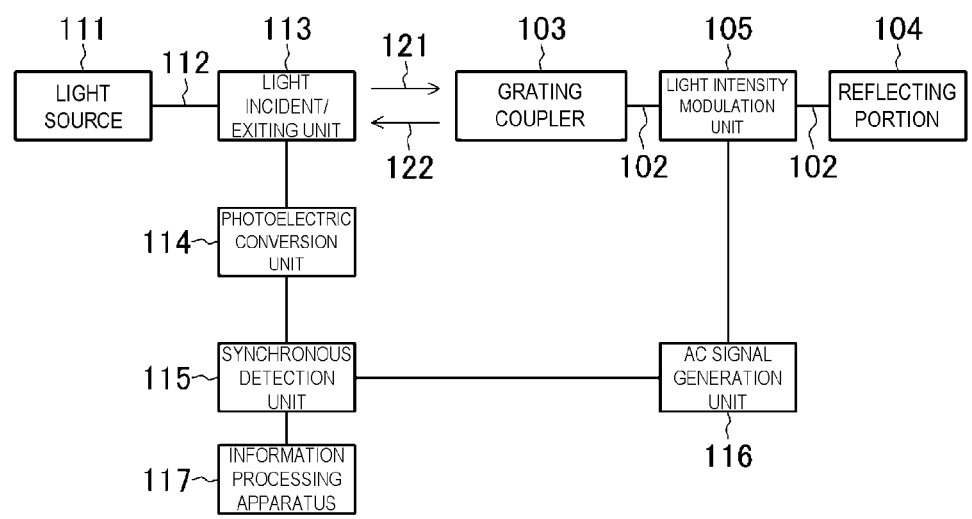
FIG. 2 is a configuration diagram illustrating a configuration of an aligning system that implements an optical aligning method according to an embodiment of the present invention.

Next, optical aligning using an optical circuit for aligning according to an embodiment will be described with reference to FIG. 2. First, light emitted from a light source 111 constituted by a semiconductor laser or the like is emitted from a light incident/exiting unit 113 provided at a tip end of an optical fiber 112 as light for aligning 121, and enters the grating coupler 103. The optical fiber 112 is, for example, a single mode optical fiber. The light incident/exiting unit 113 is, for example, an optical circulator.

Light for aligning 121 that has entered the grating coupler 103 and has been optically coupled to the grating coupler 103 is guided in the optical waveguide constituted by the core 102, is subjected to intensity modulation by the light intensity modulation unit 105, is reflected by the reflecting portion 104, passes through the light intensity modulation unit 105, and exits from the grating coupler 103.

Intensity-modulated light 122 emitted from the grating coupler 103 enters the light incident/exiting unit 113, is subjected to photoelectric conversion by a photoelectric conversion unit 114, is subjected to synchronous detection by a synchronous detection unit 115, and an intensity of the signal subjected to synchronous detection is measured by an information processing apparatus 117. The photoelectric conversion unit 114 is, for example, a power meter, and the synchronous detection unit 115 is, for example, a lock-in amplifier. By moving the optical fiber 112, the light for aligning 121 is scanned within a region where the grating coupler 103 is formed. By determining a position at which the intensity measured by the information processing apparatus 117 is maximized with the scanning, the optical fiber 112 and the grating coupler 103 are aligned.

Here, the intensity-modulated light 122 is light subjected to intensity modulation by the light intensity modulation unit 105 that is driven by an alternating-current (AC) signal of a frequency fm (for example, hundreds of kHz) generated by an AC signal generation unit 116. The AC signal generation unit 116 is, for example, a function generator. The synchronous detection unit 115 uses the AC signal of the frequency fm generated by the AC signal generation unit 116 as a reference signal, and synchronously detects an input signal.

As described above, the intensity-modulated light 122 emitted from the grating coupler 103, which is returned light from the optical circuit for aligning, has been modulated at the frequency fm by the light intensity modulation unit 105. On the other hand, light reflected back from a dummy pattern or the like around the grating coupler 103, scattered light which is background noise, and the like, do not pass through the light intensity modulation unit 105 and are not modulated.

Only the intensity-modulated light 122 subjected to intensity modulation at the frequency fm is targeted as the signal for which intensity is measured by the information processing apparatus 117, and thus return light other than the intensity-modulated light 122 described above is not an object of the intensity measurement. As a result, according to the embodiment, an S/N ratio in optical aligning using the optical circuit for aligning can be higher than that of the related-art method.

As described above, in the optical aligning method according to the embodiment, first, rough aligning is performed to make a state where light for aligning emitted from an optical fiber to be aligned is optically coupleable to the grating coupler (first step). Next, when fine aligning is performed after the rough aligning to make a state where optical coupling of the light for aligning to the grating coupler is maximized (second step), the light for aligning optically coupled to the grating coupler and guided in the optical waveguide is subjected to intensity modulation by the light intensity modulation unit and emitted from the grating coupler. The intensity-modulated light that has been subjected to intensity modulation by the light intensity modulation unit and emitted from the grating coupler is subjected to synchronous detection, and using the intensity-modulated light subjected to synchronous detection, fine aligning is performed to make a state where optical coupling of the light for aligning to the grating coupler is maximized.

Hereinafter, more details of the light intensity modulation unit 105 will be described using examples.

Example 1

Figure 3:
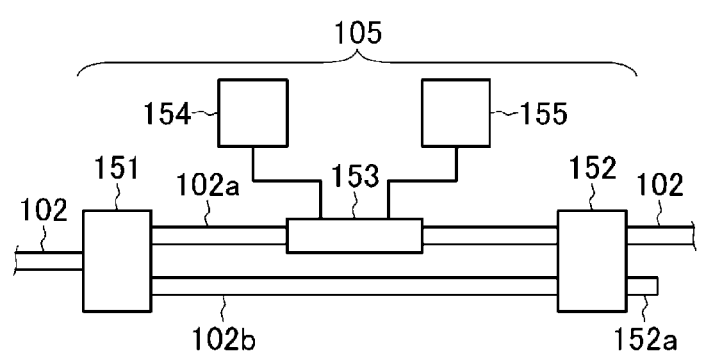
FIG. 3 is a configuration diagram illustrating a configuration of a variable optical attenuator constituting a light intensity modulation unit 105 according to Example 1.

First, a variable optical attenuator constituting a light intensity modulation unit 105 according to Example 1 will be described with reference to FIG. 3. The light intensity modulation unit 105 composed of the variable optical attenuator is constituted by a Mach-Zehnder interference structure including a first multiplexer/demultiplexer 151, a second multiplexer/demultiplexer 152, a first arm 102b, and a second arm 102C. The first multiplexer/demultiplexer 151 can be constituted by, for example, a multi-mode interferometer with input/output of 1×2. The second multiplexer/demultiplexer 152 can be constituted by, for example, a multi-mode interferometer with input/output of 2×2. Further, the first arm 102b includes a heating unit 153 for imparting a phase difference to light propagating through the optical waveguide of the first arm 102b. The heating unit 153 can be constituted by a heater made of a metal or a resistor of a semiconductor, for example.

When a voltage is applied to the heating unit 153 using a first electrode pad 154 and a second electrode pad 155 to generate Joule heat, a thermooptical effect can be induced in the optical waveguide of the first arm 102b to impart a phase difference to guided light by change in propagation time associated with change in refractive index.

In a case where there is no phase difference between light guided in the first arm 102b and light guided in the second arm 102C, multiplexed light is output to the side of the optical waveguide constituted by the core 102 of the second multiplexer/demultiplexer 152. In contrast, when there is a phase difference between light guided in the first arm 102b and light guided in the second arm 102C, multiplexed light is output to the optical waveguide 152a on the open side of the second multiplexer/demultiplexer 152.

Accordingly, when the voltage applied to the heating unit 153 is modulated at the frequency fm, the output from the second multiplexer/demultiplexer 152 toward the optical waveguide including the core 102 and the output from the second multiplexer/demultiplexer 152 toward the optical waveguide 152a are switched at frequency fm. The light output to the side of the optical waveguide constituted by the core 102 is reflected by the reflecting portion 104 to become returned light, and thus, if the voltage applied to the heating unit 153 is modulated at the frequency fm, intensity modulation (on and off) of the frequency fm can be provided to an optical signal emitted from the grating coupler 103 as returned light.

Example 2

Figure 4A:
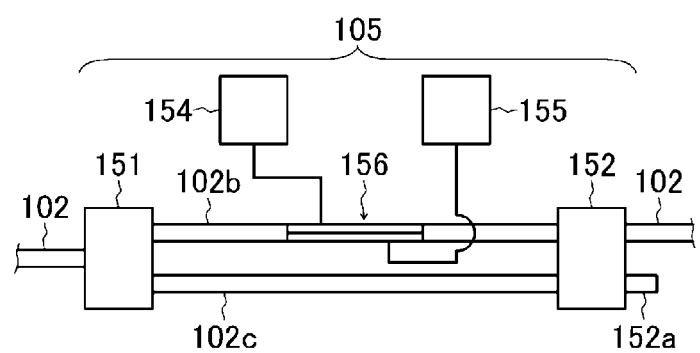
FIG. 4A is a configuration diagram illustrating a configuration of a variable optical attenuator constituting the light intensity modulation unit 105 according to Example 2.
Figure 4B:
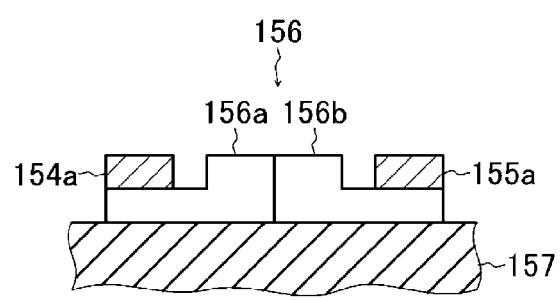
FIG. 4B is a cross-sectional view illustrating a partial configuration of the variable optical attenuator constituting the light intensity modulation unit 105 according to Example 2.

Next, a light intensity modulation unit 105 according to Example 2 will be described with reference to FIGS. 4A and 4B. The light intensity modulation unit 105 composed of the variable optical attenuator according to Example 2 is constituted by a Mach-Zehnder interference structure including a first multiplexer/demultiplexer 151, a second multiplexer/demultiplexer 152, a first arm 102b, and a second arm 102C. These are the same as those of Example 1 described above.

Further, in Example 2, in order to impart a phase difference to light propagating through the optical waveguide of the first arm 102b, a modulation unit 156 is formed by p-n junction in the core of the first arm 102b. The modulation unit 156 has, for example, a rib-type optical waveguide structure and is formed on a cladding layer 157 constituted by $SiO_2$.

In the modulation unit 156, a p-type impurity introduction region 156a and an n-type impurity introduction region 156b are joined in a joining surface that is parallel to the waveguide direction and perpendicular to the plane of the cladding layer 157 and passes through the center of the core. Furthermore, a p electrode 154a is ohmic-connected to a slab portion of the p-type impurity introduction region 156a, and an n electrode 155a is ohmic-connected to a slab portion of the n-type impurity introduction region 156b.

When a reverse voltage is applied to the modulation unit 156 constituted by p-n junction, a carrier can be pulled out of the p-n junction to induce a free carrier plasma effect in the modulation unit 156, thereby imparting a phase difference to guided light by change in propagation time associated with change in refractive index.

In a case where there is no phase difference between light guided in the first arm 102b and light guided in the second arm 102C, multiplexed light is output to the side of the optical waveguide constituted by the core 102 of the second multiplexer/demultiplexer 152. In contrast, when there is a phase difference between light guided in the first arm 102b and light guided in the second arm 102C, multiplexed light is output to the optical waveguide 152a on the open side of the second multiplexer/demultiplexer 152.

Accordingly, when the reverse voltage applied to the modulation unit 156 is modulated at the frequency fm, the output from the second multiplexer/demultiplexer 152 toward the optical waveguide constituted by the core 102 and the output from the second multiplexer/demultiplexer 152 toward the optical waveguide 152a are switched at the frequency fm. The light output toward the optical waveguide constituted by the core 102 is reflected by the reflecting portion 104 to become returned light, and thus if the voltage applied to the modulation unit 156 is modulated at the frequency fm, intensity modulation (on and off) of the frequency fm can be provided to the optical signal emitted from the grating coupler 103 as the returned light.

Example 3

Figure 5A:
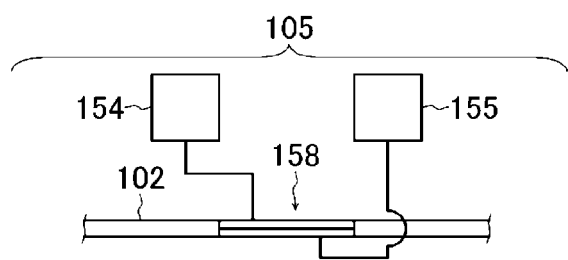
FIG. 5A is a configuration diagram illustrating a configuration of a variable optical attenuator constituting the light intensity modulation unit 105 according to Example 3.
Figure 5B:
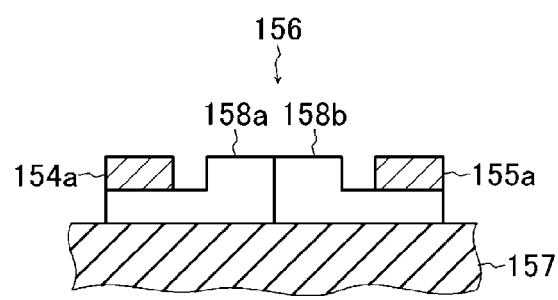
FIG. 5B is a cross-sectional view illustrating a partial configuration of the variable optical attenuator constituting the light intensity modulation unit 105 according to Example 3.

Next, a light intensity modulation unit 105 according to Example 3 will be described with reference to FIGS. 5A and 5B. The light intensity modulation unit 105 constituted by a variable optical attenuator according to Example 3 is constituted by a modulation unit 158 formed by p-n junction. The modulation unit 158 is formed in the core 102 of the optical waveguide between the grating coupler 103 and the reflecting portion 104.

The modulation unit 158 has, for example, a rib-type optical waveguide structure and is formed on a cladding layer 157 constituted by $SiO_2$. In the modulation unit 158, a p-type impurity introduction region 158a and an n-type impurity introduction region 158b are joined in a joining surface that is parallel to the waveguide direction and perpendicular to the plane of the cladding layer 157 and passes through the center of the core. Furthermore, a p electrode 154a is ohmic-connected to a slab portion of the p-type impurity introduction region 158a, and an n electrode 155a is ohmic-connected to a slab portion of the n-type impurity introduction region 158b.

When a forward voltage is applied to the modulation unit 158 constituted by p-n junction, a carrier can be injected into the modulation unit 158. With increase of injected carriers, free carrier absorption occurs in the modulation unit 158, and the intensity of light transmitted through the modulation unit 158 decreases. These allow the modulation unit 158 to operate as a variable optical attenuator.

Example 4

Figure 6:
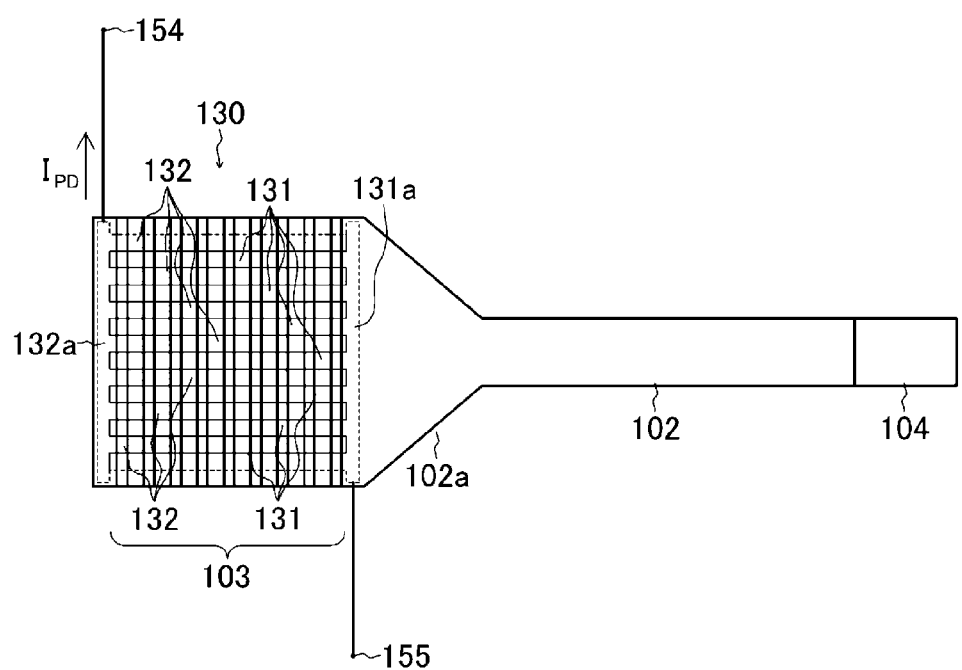
FIG. 6 is a configuration diagram illustrating a configuration of a variable optical attenuator constituting the light intensity modulation unit 105 according to Example 4.
Figure 7:
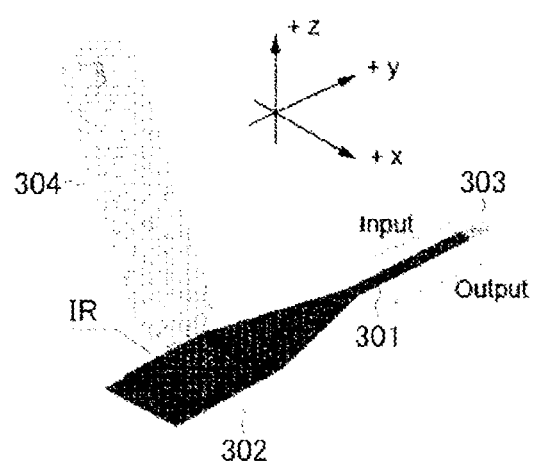
FIG. 7 is a perspective view illustrating a configuration of an optical circuit for aligning using a grating coupler.

Next, a light intensity modulation unit according to Example 4 will be described with reference to FIG. 6. The light intensity modulation unit includes a modulation unit 130 constituted by p-n junction formed in the core 102 of the grating coupler 103. The modulation unit 130 includes a p-type region 131 and an n-type region 132. In this example, the p-type region 131 and the n-type region 132 are each formed in a region having a rectangular shape in a planar view and extending in an array direction of grating, and the p-type region 131 and the n-type region 132 are arranged in a direction that is perpendicular to the array direction of grating and parallel to the plane of the substrate.

In this example, a plurality of p-type regions 131 and n-type regions 132 are formed and alternately arranged. Note that the plurality of p-type regions 131 are connected to a p-type lead-out portion 131a. The first electrode pad 154 is connected to the p-type lead-out portion 131a. Furthermore, the plurality of n-type regions 132 are connected to an n-type lead-out portion 132a. The second electrode pad 155 is connected to the n-type lead-out portion 132*a*. The plurality of p-type regions 131 and the plurality of n-type regions 132 are each formed into a comb shape, and the comb teeth are interdigitated. The p-type regions 131 and n-type regions 132 adjacent to each other form p-n junction.

When a forward voltage is applied to the modulation unit 130 constituted by p-n junction, a carrier can be injected into the modulation unit 130. With increase of injected carriers, free carrier absorption occurs in the modulation unit 130, and the intensity of light transmitted through the modulation unit 130 decreases. These allow the modulation unit 130 to operate as a variable optical attenuator.

As described above, according to embodiments of the present invention, a light intensity modulation unit is provided in an optical waveguide constituted by a core made of a semiconductor in which a grating coupler is provided, and thus an S/N ratio in optical aligning using an optical circuit for aligning can be improved.

The present invention is not limited to the embodiments described above, and it is obvious that many modifications and combinations can be implemented by a person having ordinary knowledge in the field within the technical spirit of the present disclosure.

REFERENCE SIGNS LIST

101 Substrate
102 Core
102*a* Tapered portion
103 Grating coupler
104 Reflecting portion
105 Light intensity modulation unit.

The invention claimed is:

1. An optical aligning method comprising:
a first step of performing rough aligning by optically coupling light for aligning to a grating coupler of an alignment circuit, wherein the light for aligning is emitted from an optical fiber to be aligned; and
a second step of performing fine aligning by increasing an optical coupling of the light for aligning to the grating coupler from the first step of performing rough aligning wherein in the second step, the light for aligning is subjected to intensity modulation by a light intensity modulator of the alignment circuit,
wherein in the second step, the light for aligning is emitted from the grating coupler,
wherein in the second step, an intensity-modulated light subjected to intensity modulation by the light intensity modulator and emitted from the grating coupler is subjected to synchronous detection, and
wherein in the second step, fine aligning is performed using the intensity-modulated light subjected to synchronous detection.

2. The optical aligning method according to claim 1, wherein the alignment circuit comprises:
an optical waveguide on a substrate, the optical waveguide being made of a semiconductor core;
the grating coupler, the grating coupler being disposed in the semiconductor core at a first end of the optical waveguide, the grating coupler being made of grating;
a reflecting portion at second end of the optical waveguide, the reflecting portion being optically coupled to the optical waveguide; and
the light intensity modulator.

3. The optical aligning method according to claim 2, wherein the light intensity modulator is made of a variable optical attenuator.

4. The optical aligning method according to claim 3, wherein the variable optical attenuator is made of a Mach-Zehnder interference structure in the optical waveguide between the grating coupler and the reflecting portion.

5. The optical aligning method according to claim 3, wherein the variable optical attenuator is made of a p-n junction in the semiconductor core of the optical waveguide between the grating coupler and the reflecting portion.

6. The optical aligning method according to claim 3, wherein the variable optical attenuator is made of a p-n junction in the semiconductor core of the grating coupler.

7. The optical aligning method according to claim 2, wherein the semiconductor core is a silicon core.

* * * * *